(12) United States Patent
Eigler

(10) Patent No.: US 8,739,135 B2
(45) Date of Patent: May 27, 2014

(54) STATIC INSTRUMENTATION MACROS FOR FAST DECLARATION FREE DYNAMIC PROBES

(75) Inventor: Frank Eigler, Toronto (CA)

(73) Assignee: Red Hat, Inc., Raleigh, NC (US)

( * ) Notice: Subject to any disclaimer, the term of this patent is extended or adjusted under 35 U.S.C. 154(b) by 2249 days.

(21) Appl. No.: 11/266,199

(22) Filed: Nov. 4, 2005

(65) Prior Publication Data
US 2007/0103175 A1     May 10, 2007

(51) Int. Cl.
*G06F 9/44* (2006.01)
(52) U.S. Cl.
USPC .......................................................... 717/130
(58) Field of Classification Search
USPC .................. 717/128, 130, 158; 714/38.13
IPC ...................................... G06F 11/3466,11/3409
See application file for complete search history.

(56) References Cited

U.S. PATENT DOCUMENTS

| | | | | |
|---|---|---|---|---|
| 4,802,165 A | * | 1/1989 | Ream | 714/38 |
| 5,826,005 A | * | 10/1998 | Fuller | 714/38 |
| 5,983,366 A | * | 11/1999 | King | 714/38.13 |
| 6,351,843 B1 | * | 2/2002 | Berkley et al. | 717/128 |
| 6,769,117 B2 | * | 7/2004 | Moore | 717/130 |
| 7,389,494 B1 | * | 6/2008 | Cantrill | 717/125 |
| 7,568,186 B2 | * | 7/2009 | Bhattacharya | 717/130 |

OTHER PUBLICATIONS

Prasad et al. "Locating System Problems Using Dynamic Instrumentation", Proceedings of the Linux Symposium, Jul. 2005, vol. Two, pp. 49-64.*
Cantrill et al. "Dynamic Instrumentation of Production Systems", Proceedings of the General Track: 2004 USENIX Annual Technical Conference, Jun. 2004, pp. 1-4.*
Sun Microsystems, "Solaris Dynamic Tracing Guide", Jan. 2005, Sun Microsystems, Inc.*
Prasad et al, "Locating System Problems Using Dynamic Instrumentation", Jul. 2005, Ottawa Linux Symposium Proceedings, p. 49-64 <prasad_DynInst.pdf>.*
Eigler et al, "Architecture of systemtap: a Linux trace/probe tool", Jul. 2005 pp. 1-14 <SystemTap05.pdf>.*

* cited by examiner

*Primary Examiner* — Tuan A Vu
(74) *Attorney, Agent, or Firm* — Lowenstein Sandler LLP

(57) ABSTRACT

Embodiments of the present invention provide a dynamic instrumentation system that uses statically defined probes. The probes may be defined using macro definitions. One or more libraries of macro definitions that are linked to static probes are provided in the computer system. Each probe is uniquely identified by a name having a well-defined prefix and a structured format. Probes may then be inserted at various locations and into the target software using standard macro calls. When the target software is compiled, the macro calls of each probe are expanded to calls to an existing function known as a probe handler function. Each probe handler function is identified in the computer system's symbol table with a unique symbol that corresponds to the name specified by the macro definition. When a probe is activated, the operating system kernel transfers control to an instrumentation kernel object. The instrumentation kernel object locates and runs the probe handler function to perform the actions requested for that probe.

15 Claims, 5 Drawing Sheets

STATIC INSTRUMENTATION MACROS FOR FAST DECLARATION FREE DYNAMIC PROBES

FIELD OF THE INVENTION

The present invention relates generally to monitoring computer systems and, in particular, to probing and tracing the operations of computer systems.

BACKGROUND OF THE INVENTION

As computer systems become more complicated, performance analysis must increasingly be performed on live production systems rather than in a development or test environment. Traditionally, computer systems have been analyzed using debugging tools to set breakpoints at specific locations of an application. The breakpoint interrupts the running of the computer system and allows the developer to inspect the operation of the application and enter commands. However, it is not always feasible to stop the operation of a computer system, especially a production system, in order to analyze its operations. In addition, in order to understand systematic issues, an impractically large number of breakpoints may be required.

Static probe are another known way of analyzing the operation of a computer system. Static probe are probes that have been pre-installed in various locations, such as the operating system kernel or other target software, throughout the computer system. When a probe is activated (or "fired"), control of the computer system's operations branch to perform the actions associated with the probe without the need of a breakpoint. Thus, static probes can be much more efficient than breakpoints. In addition, static probe can be used on a production system because of their minimal effect on operations.

However, known static probe tools also have their own disadvantages. For example, the known static probe tools may require special programming skills and kernel programming. For example, the Dtrace tool by Sun Microsystems requires special build changes to an application or operating system. In addition, the Dtrace tool requires the use of elaborate declarations and special programming in a separate language called "D." This makes Dtrace difficult to use or implement.

Accordingly, it may be desirable to provide a system performance tool that is easy to use. It may also be desirable to provide a system performance tool with static probes that does not require special programming or elaborate declarations.

SUMMARY OF THE INVENTION

In accordance with one feature, a method of linking a probe script to a statically defined probe is provided. The statically defined probe includes an indirect function call through a global function pointer. A name for the probe specified in the probe script is determined. A symbol having at least a portion that matches the name for the probe is then identified. A format of the probe is determined based on decoding the symbol. The probe script is converted into a probe handler function that comprises program code statements based on the format of the probe. The probe handler function is then linked to the global function pointer of the probe.

In accordance with another feature, a method of translating a probe script into a probe handler function is provided. The probe script includes a name for a probe and a set of actions to be performed when the probe is activated. The name of the probe is identified from the probe script. A symbol having at least a portion that matches the identified name is then located. Parameters of the probe are determined based on the symbol. Program code statements are then determined for the probe handler function in order to implement the actions included in the probe script when the probe is activated and based on the determined parameters.

In accordance with another feature, a method of instrumenting a program is provided. A macro definition that designates a name for a statically defined probe point is inserted into the program. The name comprises a global function pointer and encodes a format of the probe. The macro definition also includes a conditional indirect function call for the probe through the global function pointer. Calls to the macro are inserted into the program's source code at desired locations for the probe. The program source code is then compiled into object code and includes a dormant probe for each inserted macro call.

In accordance with another feature, a computer system is configured to dynamically trace its operations based on a set of statically defined probes. The system comprises a processor, a memory coupled to the processor and configured into a user space and a kernel space, and an application process. The application process runs on the processor in the user space and comprises a set of probes at statically defined locations in the computer system. The probes are activated based on a conditional indirect function call for the probe through a macro call to a global function pointer. A probe manager is configured to translate a probe script into a probe handler function that runs in the kernel space. The probe handler function is loaded as an executable object in the kernel space to perform actions specified in the probe script for the probe.

Additional features of the present invention will be set forth in part in the description which follows, and in part will be obvious from the description, or may be learned by practice of the invention. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention. In the figures.

DESCRIPTION OF THE EMBODIMENTS

Embodiments of the present invention provide a dynamic instrumentation system that uses statically defined probes. The probes may be defined using macro definitions. In some embodiments, one or more libraries of macro definitions that are linked to static probes are provided in the computer system. Each probe is uniquely identified by a name having a well-defined prefix, such as "_systemtap_probe_" or "_dtrace_probe_," and a structured format.

Probes may then be inserted at various locations and into the target software using standard macro calls. When the target software is compiled, the macro calls of each probe are expanded to calls to an existing function known as a probe handler function. Each probe handler function is identified in the computer system's symbol table with a unique symbol that corresponds to the name specified by the macro definition. When a probe is activated, the operating system kernel transfers control to an instrumentation kernel object. The instrumentation kernel object locates and runs the probe handler function to perform the actions requested for that probe.

The actions requested for a probe are specified in a probe script. The probe script may be written individually or retrieved from a library. In order to install the probe, the probe script is translated into the probe handler function. In some embodiments, the probe handler function is written in the same source code language as the target software.

The probe handler function can be specified without the need of a formal declaration. Instead, a probe's symbol may be retrieved from the computer system's symbol table and is decoded to determine the characteristics of the probe handler function. In particular, a probe script translator queries the symbol table to determine the probe's symbol. The translator then parses the symbol to determine the characteristics of the probe handler functions, such as its parameters and data types. The translator passes this information to a builder module, which generates program code statements for the probe handler function. The probe handler function can then be compiled and loaded into the kernel as an executable object. When a probe is activated, the kernel branches operation to the object to perform the actions requested for the probe.

Figure 1:
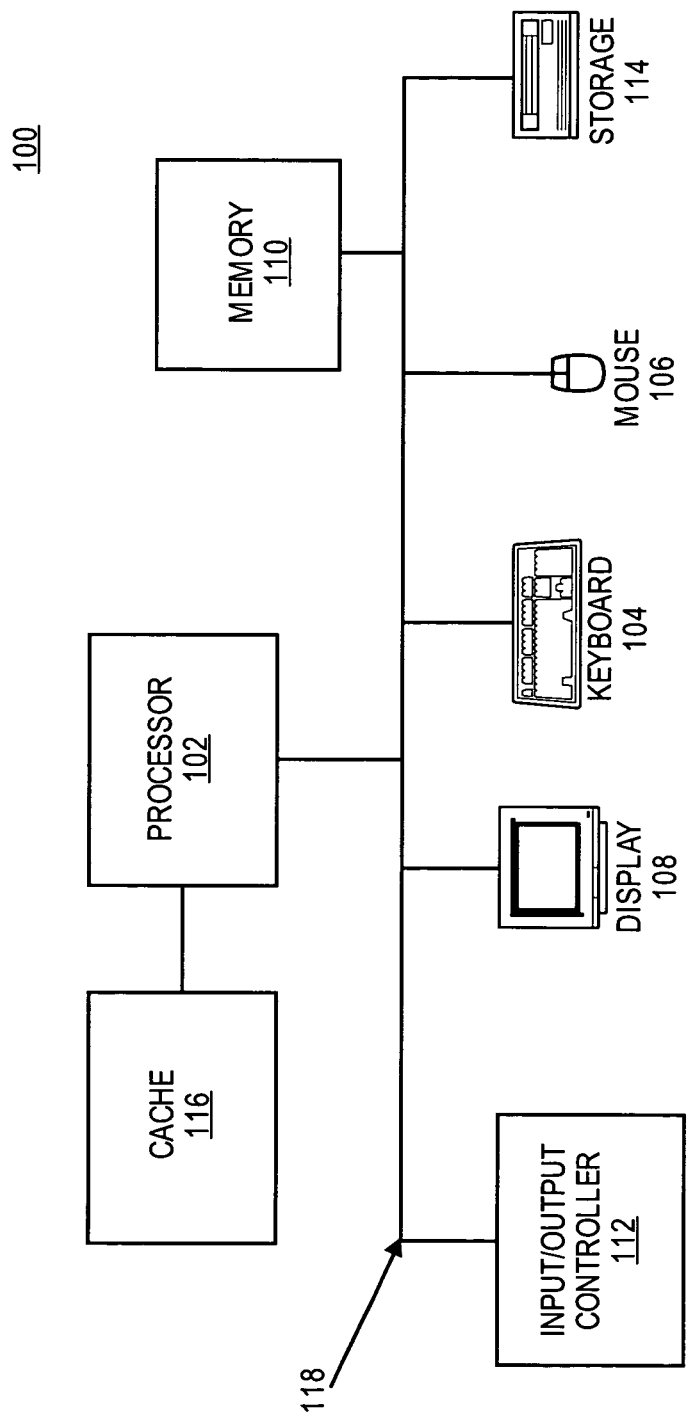
FIG. 1 is illustrates an exemplary computer system that is consistent with embodiments of the present invention.
Figure 2:
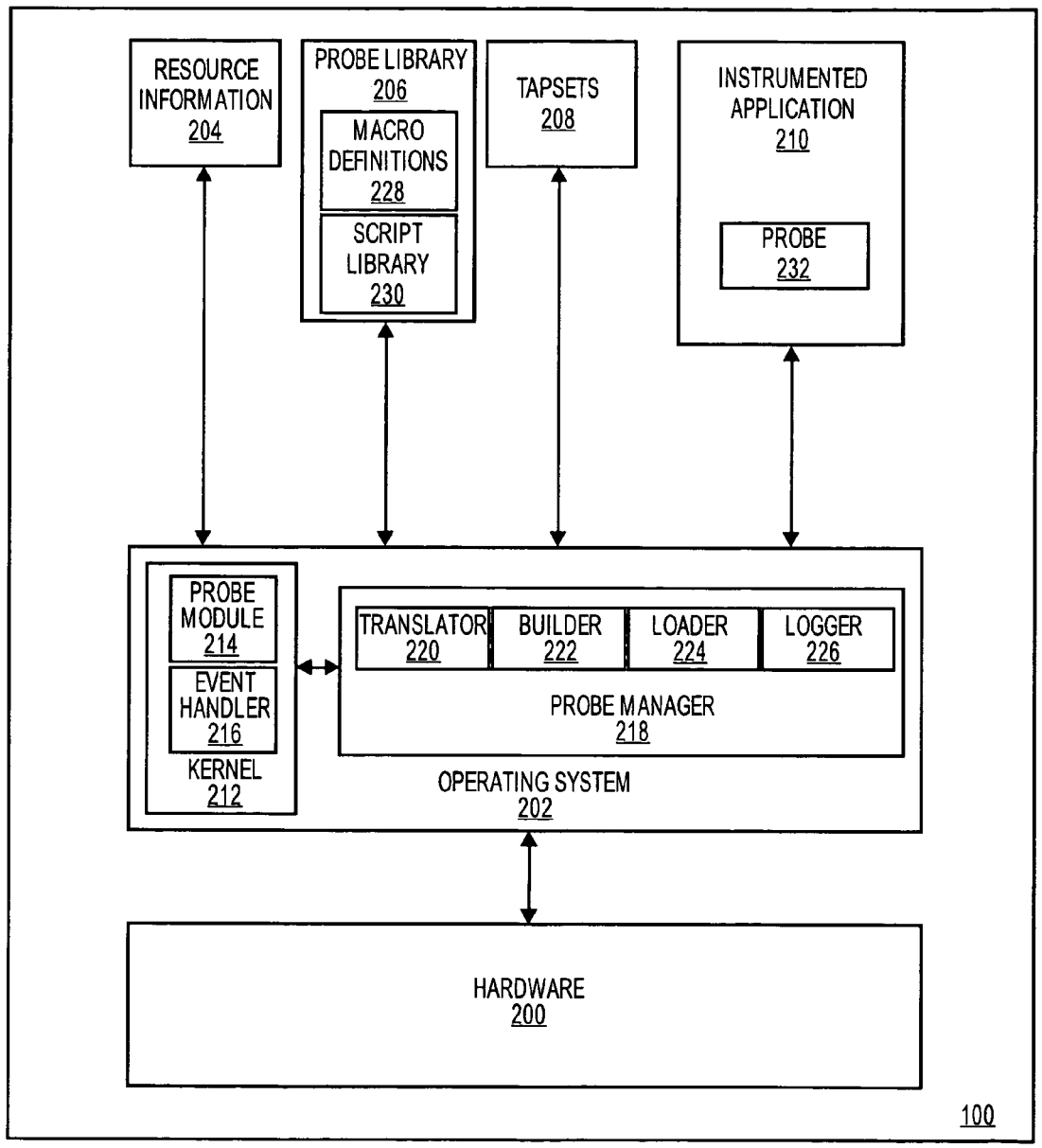
FIG. 2 illustrates an exemplary functional block diagram of the system shown in FIG. 1.
Figure 3:
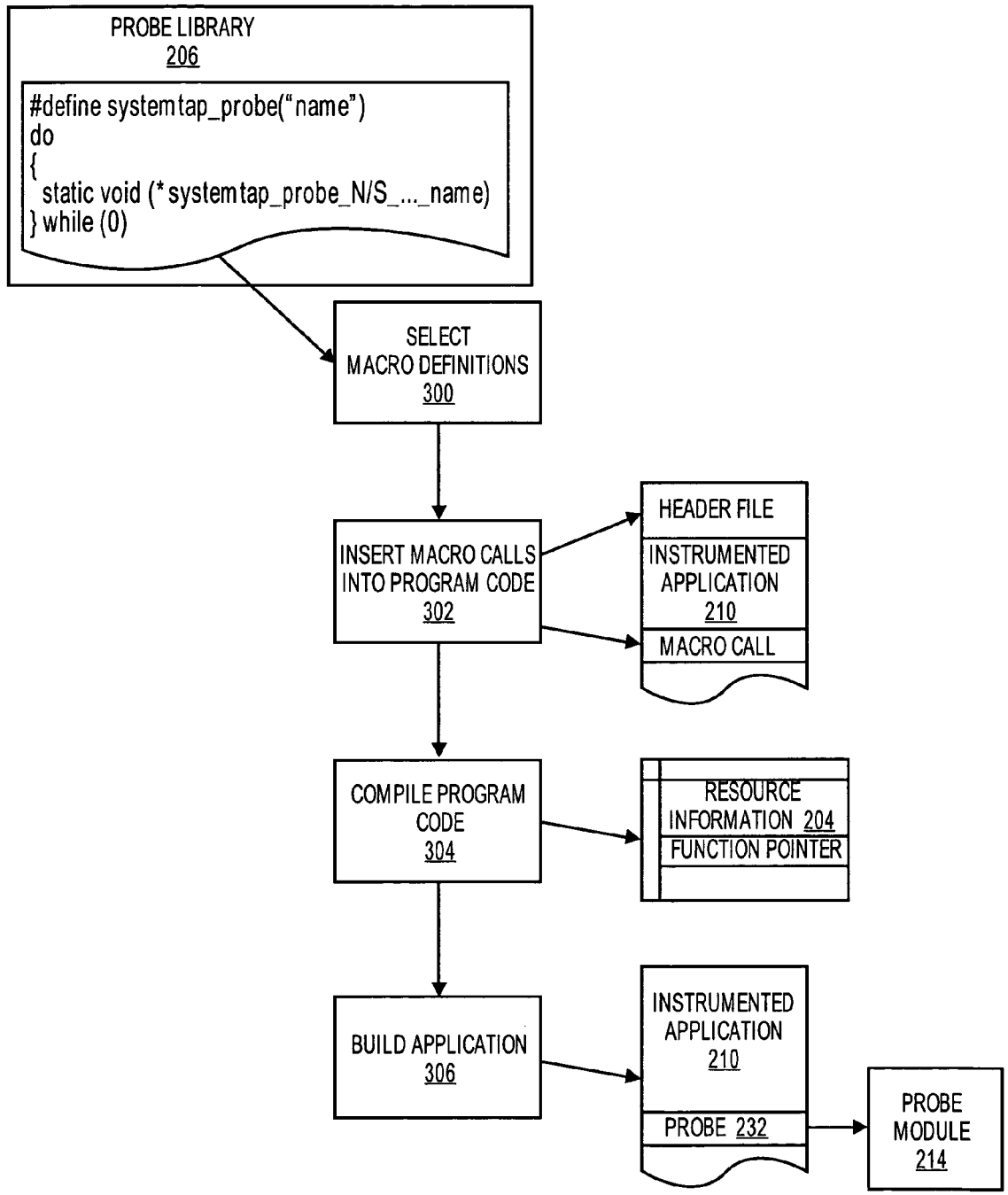
FIG. 3 illustrates an exemplary process flow for inserting probes into program code in accordance with the principles of the present invention.
Figure 4:
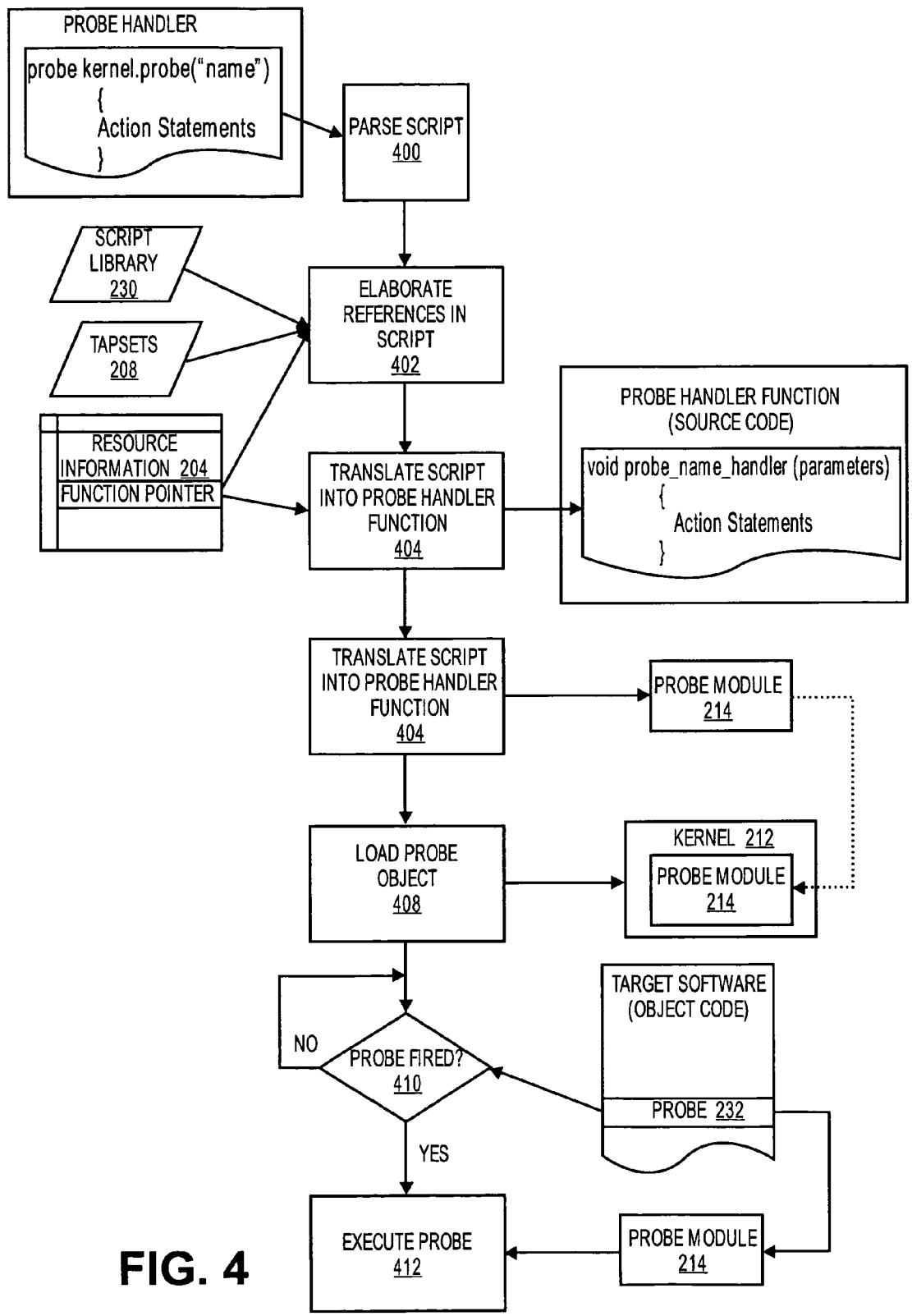
FIG. 4 illustrates an exemplary process flow for monitoring a computer system in accordance with the principles of the present invention.
Figure 5:
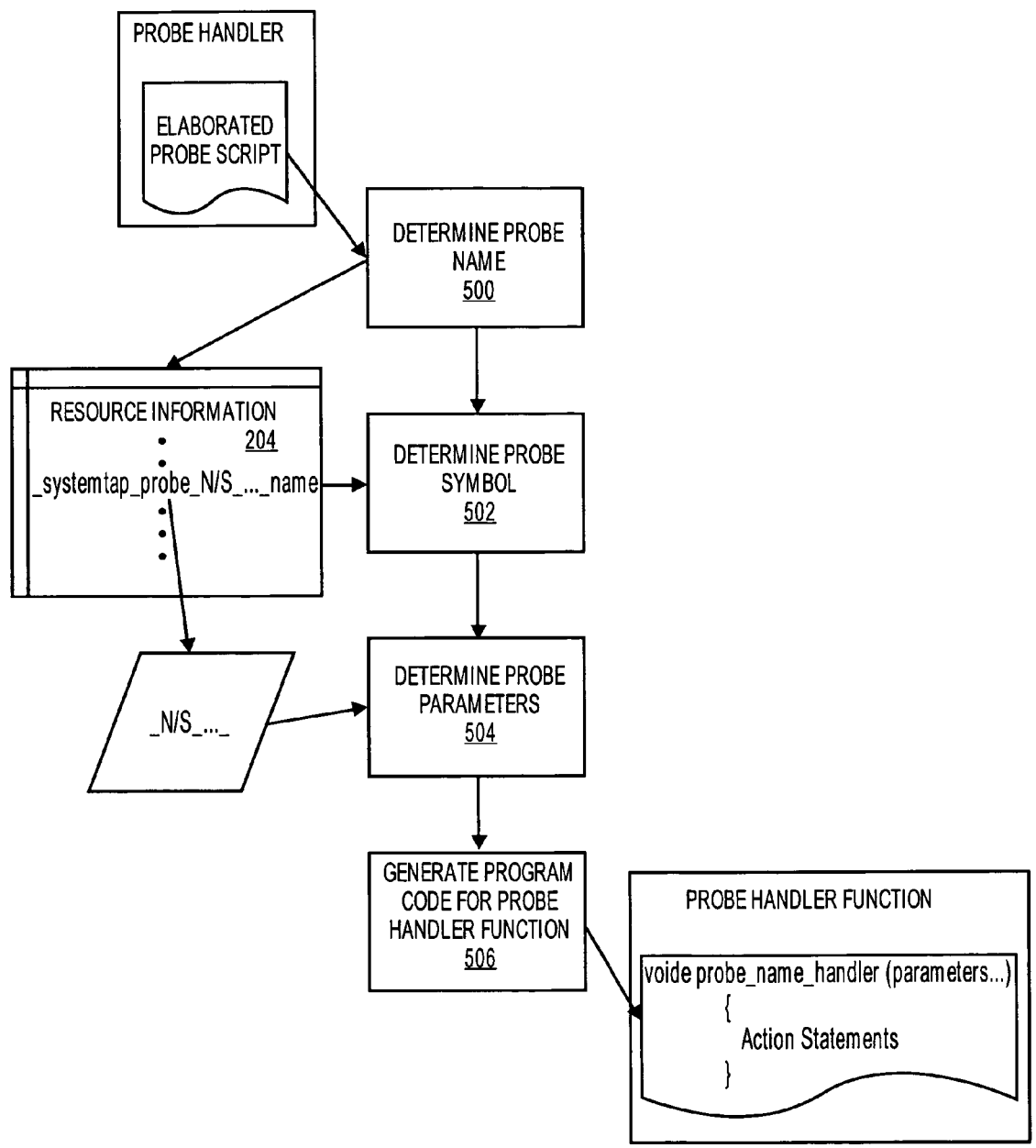
FIG. 5 illustrates an exemplary process flow for translating a probe script into a probe handling function in accordance with the principles of the present invention.

Reference will now be made in detail to exemplary embodiments of the invention, which are illustrated in the accompanying drawings. Wherever possible, the same reference numbers will be used throughout the drawings to refer to the same or like parts. FIGS. 1 and 2 provide a general description of the computer system, its components, and basic architecture. FIGS. 3-5 are then provided to explain some of the process flows related to implementing probes in a computer system.

FIG. 1 illustrates a computer system 100 that is consistent with the principles of the present invention. In general, embodiments of the present invention may be implemented in various computer systems, such as a personal computer, server, workstation, and the like. System 100 may be a system that is under development or an in-production system (i.e., a system that is in use). For purposes of explanation, system 100 is shown as a general purpose computer that is well known to those skilled in the art. Examples of the components that may be included in system 100 will now be described.

As shown, computer system 100 may include a central processor 102, a keyboard 104, a pointing device 106 (e.g., mouse, or the like), a display 108, a main memory 110, an input/output controller 112, and a storage device 114. Processor 102 may further include a cache memory 116 for storing frequently accessed information. Cache 116 may be an "on-chip" cache or external cache. System 100 may also be provided with additional input/output devices, such as a printer (not shown). The various components of the system 100 communicate through a system bus 118 or similar architecture.

One skilled in the art will recognize that system 100 may comprise various other components, such as multiple processors, additional storage devices, etc. Such components are well known to those skilled in the art.

FIG. 2 illustrates a functional block diagram for system 100. As shown, system 100 may comprise hardware 200, an operating system 202, resource information 204, a probe library 206, tapset information 208, and an instrumented application 210. These components will now be further described.

Hardware 200 represents the components of hardware and firmware described above with reference to FIG. 1, such as processor 102 and memory 110. As noted, such hardware and firmware are well known to those skilled in the art.

Operating system (OS) 202 provides basic services for running other software on system 100, such as drivers, basic input/output system code, a file system, and the like. OS 202 is an integrated collection of routines that service the sequencing and processing of programs by hardware 200. OS 202 may provide other services, such as resource allocation, scheduling, input/output control, and data management. OS 202 may be predominantly software, but may also comprise partial or complete hardware implementations and firmware. Well known examples of operating systems that are consistent with the principles of the present invention include GNU/Linux, AIX by IBM, and Sun Solaris by Sun Microsystems.

Kernel 212 serves as the core of OS 202. Kernel 212 is responsible for providing access to hardware 200 and to various computer processes. Since there may be multiple programs running, kernel 212 also schedules when and how long the various computer processes can make use of hardware 202.

Probe object 214 is a module or component of kernel 212 that services a probe when it is activated. Probe object 214 may be augmented by information about the name and location of entry points and external calls (to functions not contained in the object). In some embodiments, probe object 214 is generated from compiled program code known as a probe handler function and linked with the runtime of OS 202 into a stand-alone object or module of kernel 212.

Event handler 216 is a module of kernel 212 that determines when a probe has been activated. In particular, event handler 216 determines when a program's execution has generated an event, such as an interrupt or branch, based on reaching a probe. Event handler 216 may then determine whether a probe has been activated and transfers control to probe object 214. In some embodiments, event handler 216 is compiled program code and also linked with the runtime of OS 202 into a stand-alone module of kernel 212.

Probe manager 218 provides a facility for statically defining probes and dynamically tracing the operations of system 100. For example, probe manager 218 may receive as its input a probe handler. The probe handler is a script that describes an association of probe handler functions with probe points and the actions to be performed when the probe point is activated or "hit" during operations by computer system 100. Probe points are the abstract names give to identify a particular place in kernel 212 or user code, such as application 210, or a particular event (e.g., a timer or counter) that may occur at any time. As shown, probe manager 218 may comprise a script analyzer 220, a translator 222, a loader 224, and a logger 226. These components and their respective functions will now be further described.

Script analyzer 220 analyzes the script of the probe handler and resolves any needed symbolic references contained in the probe handler. For example, script analyzer may resolve symbolic references to kernel 212, user programs, such as application 210, or tapset information 208.

For example, script analyzer 220 may resolve run time addresses of references in the probe handler to function parameters, local and global variables, source locations, and the like. Script analyzer 220 may resolve this information using information, such as resource information 204, tapset information 208, and probe library 206.

Translator 222 translates the elaborated form of the probe handler into program source code, such as C code, known as a probe handler function. Each probe handler function may include various features, such as locking checks, safety checks, and runaway-prevention logic, to ensure that the probe handler can safely run on computer system 100. Each variable shared amongst probes may be mapped to an appropriate static declaration, and accesses may be protected by locks. Each group of local variables may be placed into a synthetic call frame structure.

Translator 222 may wrap each probe handler function using a probe point registration application programming interface that is included with computer system 100. For probe points located in kernel 212, translator 222 may leverage an existing probe facility, such as kprobes from IBM. For probe points located in user applications, probe points may be inserted into specific processes' executable segments using a macro call mechanism.

Translator 222 may generate the probe handler function to include references to a common runtime that provides routines for generic lookup of tables, constrained memory management, startup, shutdown, input and output functions, and other functions.

Loader 224 compiles and loads the probe handler function from translator 222 and links it with the runtime of operating system 202 into a stand alone module of kernel 212, such as probe object 214. For security reasons, loader 224 may cryptographically sign probe object 214 so that it may be archived and later reused on computer system 100 or on another computer without a compiler installed.

Logger 226 records any relevant information about system 100 when a probe is activated. Logger 226 may be configured to collect information about kernel 212 and user space applications, such as instrumented application 210. Accordingly, logger 226 may collect information from virtually any aspect of computer system 100.

Resource information 204 contains information to locate functions, local variables, types, and declarations. In particular, resource information 204 comprises information for making resources of computer system 100 available to programs. These resources may be items, such as procedures (e.g., functions or subroutines of operating system 202, variables, static data (e.g., named constants or icons), and the like. Each resource exists at an offset in a library file loaded into operating system 202 and each resource may also have a name or "symbol."

In order for a program to access a resource in a library, it must know the resource's byte offset in the file. Since libraries may change from time to time, it is usually more convenient for the calling program to look up the byte offset in a data table inside the library. Accordingly, resource information 204 may include what is generally known as a symbol table, which provides a mapping between a resource's name and the offset in the library file. For example, embedded and linkable format symbol tables are well known to those skilled in the art.

Probe Library 206 is a collection of information for defining and implementing probes. For example, as shown in FIG. 2, probe library 206 may comprise macro definitions 228 and script library 230.

Macro definitions 228 provide a family of macro definitions that are accessible to kernel 212 or other programs. For example, one or more of macro definitions 228 may be inserted into the header files of a program, such as instrumented application 210. In some embodiments, macro definitions 228 may include attribute declarations into macros for a static function pointer variable in order to ensure that a probe's symbol appears in a symbol table of resource information 204.

Script library 230 provides a family of probe scripts. For example, script library 230 may comprise various script files for probe definitions, auxiliary function definitions, and global variable declarations. A probe definition identifies one or more probe points and includes a body of actions to perform when any of the probes at the probe points are activated. An auxiliary function is a subroutine that may be used by a probe handler and other functions. A global variable declaration lists variables that are shared by all probe handlers and auxiliary functions. A basic script file may also include references to other files in script library 230 or tapset information 208. In addition, scripts in script library 230 may include other related values, such as the stringified version of actual input expressions, such as "#__1num". Furthermore, probe scripts may include one or more extensions in order to support multiple concurrent active probe scripts that are associated with the same probe point.

Tapset information 208 may comprise libraries of script or program code that are used to assist or extend the capabilities of the basic script used in the probe handler.

Instrumented application 210 may be any base of software that is targeted for instrumentation. For example, as shown in FIG. 2, instrumented application 210 may comprise a probe 232. Probe 232 defines a location in application 210 in which instrumentation is requested. In some embodiments, probe 232 is inserted as a macro call into the source code of application 210.

FIG. 3 shows an exemplary process for probing and tracing program code in accordance with the principles of the present invention. In stage 300, one or more macro definitions are selected. For example, an administrator or developer may browse macro definitions 228 and select one or more macros from macro definitions 228. The administrator or developer may also manually write a macro definition.

In some embodiments, a macro definition for a probe may generally be formatted as follows:

```
#define systemtap_probe("name")
do
{
    static void (*systemtap_probe_N/S_..._name)
    (action statements)
} while (0)
```

In stage 302, macro calls are inserted into the target program code that is to be instrumented. For example, an administrator or developer may insert the selected macro definitions from macro definitions 228 into the header file for instrumented application 210. The developer or administrator may then augment instrumented application 210 with one or more macro calls at various locations of interest, such as at the location of probe 232.

In stage 304, instrumented application 210 is compiled into object files that are executable by system 100. In some embodiments, during compilation of instrumented application 210, the macro calls for probe 232 are expanded to calls to an existing probe handler function having a well-defined prefix, such as "_systemtap_probe_," to its symbol in a symbol table of resource information 204.

In stage 306, the developer or administrator links together the object files in order to build instrumented application 210. Unlike conventional tools, embodiments of the present invention do not require any changes to the normal build process for application 210. Hence, the compiled object files for instrumented application 210 may be linked together to create an application binary that is executable by computer system 100. In some embodiments, the probe handler function for probe 232 is compiled into the same native program code as the source code of instrumented application 210 and is loaded as an executable module or object into kernel 212. This allows kernel 212 to merely branch its operations and avoid shifting to another execution environment. For example, typical implementations of Dtrace probes require an augmented build process and formal declarations for the probes. In addition, Dtrace probes are compiled into a different programming language, i.e., the "D" language, which also requires kernel 212 to shift its operations more dramatically.

FIG. 4 illustrates an exemplary process flow for monitoring a computer system in accordance with the principles of the present invention. In stage 400, a probe script is submitted to probe manager 218. Probe manager 218 then passes the probe script to translator 222.

In stage 402, the probe script is analyzed and references elaborated. In particular, translator 222 analyzes the probe script, resolves any symbolic references, for example, to kernel 212, user programs, or any other tapsets. For example, translator 222 may resolve references to function parameters, function pointers, local and global variables, and source locations to actual runtime addresses. Translator 222 may perform this analysis by referring to probe library 206, script library 230, tapset information 208, and resource information 204 and generate a fully elaborated version of the probe script. Processing may then flow to stage 404.

In stage 404, the script is translated into a probe handler function. In particular, builder 222 may translate the elaborated probe script into program code known as the probe handler function. For example, builder 222 may be configured to translate probe script into a quantity of C code. In addition, builder 222 may include various locking and safety checks when generating the probe handler functions. Each variable shared among probes may be mapped to an appropriate static declaration and accesses may be protected by locks. In addition, each group of local variables in a probe handler function may be placed into a synthetic call frame structure. The translation of the probe script into a probe handler function is further described with reference to FIG. 5.

In some embodiments, builder 222 may wrap the probe handler function by an interface function that uses an appropriate probe point registration application programming interface. For example, in some embodiments, builder 222 may use kprobes for location-type probes targeted at kernel 212. Kprobes is a known dynamic instrumentation system that is included in the kernel of LINUX operating systems. Of course builder 222 may also implement probes into user space programs, such as instrumented application 210, using inserted macro calls as described above with reference to FIG. 3. Accordingly, embodiments of the present invention may provide comprehensive dynamic instrumentation that spans virtually all locations of computer system 100.

In stage 406, the probe handler function is compiled and loaded. In particular, probe manager 218 compiles the script into native code, such as C language code, and links it with the runtime library to create a loadable kernel module. Processing may then flow to stage 408.

In stage 408, the program handler function is loaded as a module or object into the kernel 212, such as probe module 214. Since the probe handler function is built as a module of kernel 212, kernel 212 does not need to be recompiled or rebooted in order to provide the instrumentation requested by the probe. Thus, computer system 212 may continue with its normal operations. Processing may then flow to stage 410.

In stage 410, operating system 202 monitors for when a probe is activated. If a probe has not been activated, then normal processing by computer system 100 continues and probe processing loops back to stage 410.

If a probe has been activated, then in stage 412, system 100 performs the actions specified in the probe. For example, when probe 232 in instrumented application 210 is encountered, application 210 may make an indirect function call that is serviced by kernel 212. In response, kernel 212 invokes event handler 216, saves the current instruction in a buffer, and the instruction at that location is replaced by a breakpoint or branching instruction to execute the probe. Event handler 216 determines whether the current event is for a probe or some other type of breakpoint or error by checking the information in resource information 204. If there is no probe registered for that location, then event handler 216 processes the event as a normal breakpoint and passes it on to an appropriate handler. However, if a probe has been found, then event handler 216 invokes the probe handler function, for example, by executing probe module 214.

Once probe module 214 has completed its actions, kernel 212 may resume at the instruction following the probed instruction. Normal operation by kernel 212 and instrumented application 210 may then resume. In addition, in some embodiments, probe module 214 may be unloaded once it has completed its processing.

FIG. 5 illustrates an exemplary process flow for translating a probe script into a probe handling function in accordance with the principles of the present invention. In stage 500, a probe name is determined. In particular, translator 222 parses the statements in the probe script and locates the argument that indicates the name for the probe. For example, the probe script may include a probe point specification such as "probe kernel.probe("name") { . . . trace (arg$0) . . . }. Although the probe's name is shown as a simple text field, the probe's name may be formatted, for example, with substrings or numbers in order to ensure that each probe has a unique name. Processing then flows to stage 502

In stage 502, a probe symbol is determined. In particular, translator 222 may search one or more symbol tables in resource information 204 to locate the probe's symbol. In some embodiments, translator 222 can automatically find probes in the symbol table because of they are marked with a well-defined prefix, such as "_systemtap_probe_" and ending with the name of the probe. Processing then flows to stage 504.

In stage 504, parameters for the probe are determined. In some embodiments, translator 222 may identify the parameters from the probe based on decoding its symbol. For example, a probe's symbol may include one or more fields between the prefix and the name that indicate the parameters of the probe. Probe parameters may relate to whether the probe is handling characters or numbers, and the like. For example, a probe's symbol may be "_systemtap_probe_ns_##_name". Accordingly, translator 222 may decode the characters, such as "ns" into the type information and type arguments for the probe. Processing may then flow to stage 506.

In stage 506, program code for the probe handler function is generated. In some embodiments, translator 222 may generate C language code for the probe handler function. Since translator 222 discovered the argument types for the probe from its symbol in the symbol table, translator 222 may synthesize a compatible routine. In addition, since translator 222 also determined the address of the static function pointer variable from the symbol table (perhaps as an offset from a runtime address), translator 222 may set the probe handler function to point to this address as a synthetic function. The probe handler function may then call into the functions defined by the action statements in the probe script since the auxiliary information has been set up from parsing the probes symbol.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of linking a probe script to a probe, said method comprising:
    converting, by a processor, the probe script into a probe handler function that comprises program code statements in view of a name of the probe; and
    linking the probe handler function to a global function pointer of the probe,
    wherein the probe is generated from a source code of a program by:
        inserting, into the source code of the program, a macro definition that designates the name for the probe, wherein the name is associated with the global function pointer and encodes a list of actions to be performed by the probe, wherein the macro definition comprises a conditional indirect function call for the probe through the global function pointer;
        inserting, into the source code at selected locations, a respective static marker function defined according to the macro definition; and
        compiling, by the processor, the source code of the program comprising the respective static marker function into an object code, wherein the object code comprises a respective probe for the respective static marker function; and
    marking a predicate of the probe with a low branch probability attribute; and
    translating the name of the probe to a generated function name used in the probe handler function, wherein the generated function name is globally unique,
    wherein a call to the macro definition specifies a parameter list to be passed to the probe.

2. The method of claim 1, further comprising executing the probe handler function.

3. A method comprising:
    translating a probe script into a probe handler function;
    identifying the name of the probe from the probe script, wherein the probe is generated from a source code of a program by:
        inserting, into the source code of the program, a macro definition that designates a name for the probe, wherein the name is associated with a global function pointer and a list of actions to be performed by the probe, wherein the macro definition comprises a conditional indirect function call for the probe through the global function pointer;
        inserting, into the source code at selected locations, a respective marker function defined according to the macro definition; and
        compiling, by a processor, the source code of the program comprising the respective static marker function into an object code, wherein the object code comprises a respective probe for the respective static marker function; and
    linking the probe handler function to the global function pointer;
    locating from the probe script a symbol having at least a portion that matches the identified name;
    determining parameters of the probe in view of the located symbol;
    determining program code statements for the probe handler function that implement the actions included in the probe script when the probe is activated in view of the determined parameters,
    marking a predicate of the probe with a low branch probability attribute; and
    translating the name of the probe to a generated function name used in the probe handler function, wherein the generated function name is globally unique,
    wherein a call to the macro definition specifies a parameter list to be passed to the probe.

4. The method of claim 3, further comprising rendering the probe inactive when the actions of the probe have been performed.

5. The method of claim 3, further comprising translating the probe pointer name to a generated function name used in the probe handler function.

6. The method of claim 3, wherein determining program code statements for the probe handler function comprises:
    identifying action statements in the probe script; and
    translating the action statements in the probe script into program code statements in the probe handler function.

7. The method of claim 3, further comprising:
    compiling the probe handler function into an object; and
    loading the object into an operating system.

8. The method of claim 3, further comprising passing information that indicates input expressions to the probe script.

9. A method of instrumenting a program, said method comprising:
    inserting, into a source code of the program, a macro definition that designates a name for a probe, wherein the name is associated with a global function pointer and a list of actions to be performed by the probe, wherein the macro definition comprises a conditional indirect function call for the probe through the global function pointer;
    inserting, into the source code at selected locations, a respective static marker function defined according to the macro definition;
    compiling, by a processor, the source code of the program comprising the respective static marker function into an object code, wherein the object code comprises a respective probe for each static marker function;
    executing, by the processor, a probe script that has been converted into a probe handler function;
    linking the probe handler function to the global function pointer;
    marking a predicate of the probe with a low branch probability attribute; and
    translating the name of the probe to a generated function name used in the probe handler function, wherein the generated function name is globally unique,
    wherein a call to the macro definition specifies a parameter list to be passed to the probe.

10. The method of claim 9, wherein inserting the macro definition comprises inserting the macro definition into a header file of the source code of the program.

11. The method of claim 9, further comprising building an application from the compiled source code of the program that comprises the respective probe that is linked to the probe.

12. The method of claim 9, wherein the macro definition comprises attribute declarations for a static function pointer variable.

13. A computer system, said system comprising:

a processor;

a memory coupled to the processor, the memory including a user space and a kernel space;

an application process running on the processor in the user space and comprising a probe at a defined location in the computer system, wherein the probe is activated in view of a conditional indirect function call for the probe through a macro call to a global function pointer, wherein the probe is generated by:

inserting, into the source code of the program, a macro definition that designates a name for the probe, wherein the name is associated with a global function pointer and a list of actions to be performed by the probe, wherein the macro definition comprises a conditional indirect function call for the probe through the global function pointer;

inserting, into the source code at selected locations, a respective static marker function defined according to the macro definition; and compiling, by a processor, the source code of the program comprising the respective static marker function into an object code, wherein the object code comprises a respective probe for the respective static marker functions;

linking the probe handler function to the global function pointer;

marking a predicate of the probe with a low branch probability attribute; and translating the name of the probe to a generated function name used in the probe handler function, wherein the generated function name is globally unique; and a probe manager to translate a probe script into a probe handler function that runs in the kernel space, wherein the probe handler function is loaded as an executable object in the kernel space to perform actions specified in the probe script for the probe, and wherein the call to the macro definition specifies a parameter list to be passed to the probe.

14. The system of claim 13, wherein the call to the macro definition specifies a parameter list to be passed to the probe.

15. The system of claim 13, wherein inserting the macro definition comprises inserting the macro definition into a header file of the source code of the program.

\* \* \* \* \*